United States Patent [19]

Stewart

[11] Patent Number: 5,902,990
[45] Date of Patent: May 11, 1999

[54] BAR CODE SCANNER GUIDE

[76] Inventor: William C. Stewart, 7616 Elliott Dr., Raleigh, N.C. 27613

[21] Appl. No.: 08/599,580

[22] Filed: Feb. 9, 1996

[51] Int. Cl.[6] .............................. G06K 13/06; G06K 7/10
[52] U.S. Cl. ............................................. 235/483; 235/472
[58] Field of Search ..................................... 235/472, 483

[56] References Cited

FOREIGN PATENT DOCUMENTS

| 56-79368 | 6/1981 | Japan | 235/472 |
| 9116688 | 10/1991 | WIPO | 235/472 |

OTHER PUBLICATIONS

IBM Technical Disclosure Bulletin vol. 14 No. 8 Jan. 1972.
IBM Technical Disclosure Bulletin vol. 20 No. 10 Mar. 1978.

*Primary Examiner*—Donald T. Hajec
*Assistant Examiner*—Douglas X. Rodriguez
*Attorney, Agent, or Firm*—Mills & Associates; Clifford F. Rey

[57] ABSTRACT

A scanner guide for attachment to a pre-existing bar code scanner wand to enable such a wand to read bar coded labels disposed on a cylindrical surface of a relatively small diameter such as containers used for the collection of medical specimens. The scanner guide includes a cylindrical pin having a mounting base for positioning the same in generally parallel relation to a center axis of the scanner wand at a predetermined distance therefrom based upon the diameter of the cylindrical containers whereon the bar coded labels are disposed. A bottom surface of the mounting base is shaped to conform to the contour of the wand whereon it is to be mounted. In such an arrangement the scanner wand is held at a proper disposition in relation to the bar coded label as it is passed in a longitudinal direction over the same on the cylindrical surface. Thus, the proper reading may be obtained with a single passing and the scanning guide eliminates the necessity of repeated attempts at reading the bar code when disposed on a cylindrical surface.

9 Claims, 4 Drawing Sheets

FIG. I

BAR CODE SCANNER GUIDE

BACKGROUND OF INVENTION

1. Field of Invention

This invention relates to optical scanners and, more particularly, to a bar code wand reader adapted to read a bar code disposed on a curved surface.

Wand readers for scanning a bar code label are well known to those skilled in the art. Such a pen-shaped wand is commonly used to input data contained in printed bar code labels affixed to selected goods to an attached computer system. Such a bar code provides a method of coding the data such that it will represent the necessary numerical characters needed to identify the product being scanned.

Although such wand readers are well suited to use with products whereon the bar coded label may be fixed to a flat surface, a problem arises when attempting to attach such bar coded labels to a relatively small curved surface. Because the wand reader must be passed over the bar code at a relatively fast and constant speed, the degree of muscle control required to perform this task on a small curved surface makes it difficult to get a proper reading and numerous passes are almost invariably required to do so.

Thus, the present invention has been developed to provide a simple yet efficient device to enable a standard wand reader to be used to scan a bar coded label on a small curved surface.

2. Description of Related Art

U.S. Pat. No. 5,231,278 to Ming-Tai D. Kuo discloses a bar code wand reader adapted to read a bar code disposed on a narrow surface such as an edge of a printed wiring board.

U.S. Pat. No. 5,300,762 to Robert L. Roske discloses a shoe adapter for a bar code wand which frictionally engages a portion of the scanning head of the wand and maintains the wand at a consistent distance from the bar code label.

U.S. Pat. No. 5,373,165 to William A. Willson discloses a guide for mounting on an optical scanner having a laterally extending guide arm whereby the scanner can be moved in a parallel relationship with a straight edge to prevent lateral movement of the scanner for superior scanning capability.

U.S. Pat. No. 3,818,188 to Guther Hertel, et al. discloses a device for positioning a data carrier in a reading apparatus, the data carrier being attached, for example, to a test tube by means of a coupling element.

U.S. Pat. No. 4,457,016 to George B. Pfeffer discloses a file label reading system including a manually controlled wand which is adapted by the provision of a jig used to bear against the edge of at file for locating the wand in a read position over the bar code to steady the manual movement of the wand in order to provide an accurate reading of the code.

U.S. Pat. No. 4,210,802 to Toshiyasu Sakai discloses a bar code scanner having a pair of parallel side guide members connected by a transverse guide number which defines a scanning line at the end portions of the parallel side guide members.

U.S. Pat. No. 4,463,251 to Pauli Koutonen, et al. discloses a method for the identification of paper rolls by means of a code attached to or marked on the end surface of the roll. The code is read by a combined signal optical beam transmitter-receiver, including a guide arm which serves to locate the scanner in the center of the paper roll to provide an accurate reading.

Finally, U.S. Pat. No. 3,413,447 to Herbert La Mers discloses an information bearing label and method of reading the same which utilizes a wand reader having a center probe for locating the wand relative to a radially arranged bar code.

SUMMARY OF THE INVENTION

After much research and study of the above mentioned problems, the present invention has been developed to provide a method and apparatus for converting a conventional bar code scanner wand adapted for scanning bar code labels on a flat surface to a scanner wand suitable for use on a curved surface.

The bar code scanner guide of the present invention comprises an elongated, cylindrical guide pin that is adapted for installation on a commercially available scanner wand in order to adapt the same for use with relatively small, cylindrical items such as Vacutainer tubes for the collection of medical specimens and other similar items.

The guide pin is provided with a mounting base portion which is applied by adhesive means to the terminal end of the scanner wand thereby positioning the guide pin in functional relation to the lens thereof Thus, in this arrangement, the scanner wand lens is held at a proper disposition as the same is passed over the bar code label disposed on the curved surface of the Vacutainer tube providing a good reading with a single pass over the coded label.

In view of the above, it is an object of the present invention to provide a device which may be applied to the exterior surface of a commercially available scanner wand to adapt the same for use in scanning a bar coded label fixed to a curved surface such as a Vacutainer tube or other similarly shaped object.

Another object of the present invention is to provide a method of converting a preexisting scanner wand into a device suitable for use with relatively small, cylindrical objects whereon a bar coded label is disposed.

Other objects and advantages of the present invention will become apparent and obvious from a study of the following description and the accompanying drawings which are merely illustrative of such invention.

DETAILED DESCRIPTION OF INVENTION

Figure 1:
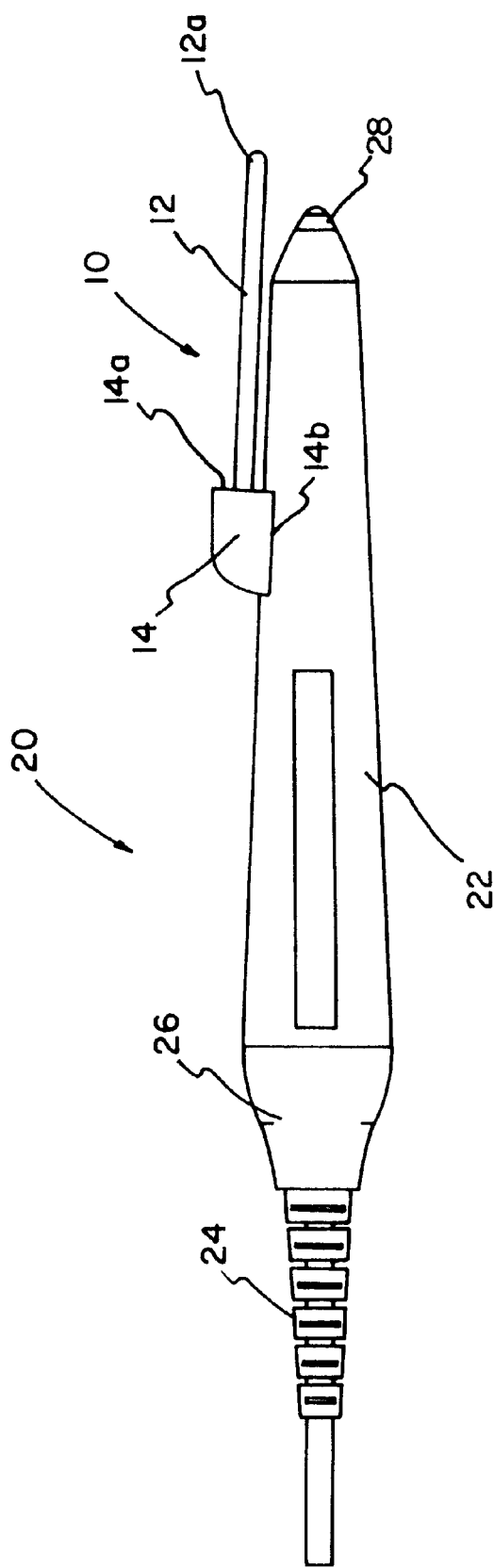
FIG. 1 is a top plan view of a standard optical scanner wand showing the device of the present invention installed thereon.

With further reference to the drawings, a bar code scanner guide in accordance with the present invention is illustrated in FIG. 1 and indicated generally at 10. The scanner guide 10 is shown installed in its functional position on a conventional scanner wand, indicated generally at 20, of the type that is normally utilized to optically scan printed bar code labels attached to various products over which it is passed.

Before describing the scanner guide 10 of the present invention in detail, it may be beneficial to review the structure of a conventional wand scanner 20 whereon the present invention is installed in its functional position.

Scanner 20 is defined by a generally pen-shaped body portion 22 which is operatively connected by means of a flexible cable 24 including a connector 26 to a computer system (not shown) or other display means. The scanner wand 20 optically scans printed bar code labels 35 attached to the surface of various items over which it is passed.

A bar coded label utilizes a method of coding the data which represents the necessary numerical characters needed to identify the particular item. Such a bar coded label may be applied to various items in a retail store or other business. The user of the scanner 20 passes the same over the bar code which identifies the product and a signal is input to a computer which is operatively connected to a cash register to enter sale of the merchandise or other transaction. Bar codes are also being widely used in almost any field of endeavor, including but not limited to warehouses, laboratories, etc.

Since such bar code labeling and scanning systems are well known to those skilled in the art, further detailed discussion of the same is not deemed necessary.

However, using such a known bar code scanner 20 to read a bar coded label affixed to a curved surface as would be encountered on a cylindrical object of less than one inch diameter produces a problem. In order to produce a reliable reading, the lens 28 of the scanner must be passed over the bar coded label at a relatively fast and constant speed. Further, the lens 28 must remain at a uniform distance from the bar coded label in order to obtain a proper reading.

It will be appreciated that the degree of eye-hand coordination and dexterity that is required to obtain a proper reading on a curved surface makes this task virtually impossible with a hand-held scanner.

In the preferred embodiment, the scanner guide 10 is adapted to be mounted on the outside diameter of scanner 20 in functional relation to lens 28. The bar code scanner 20 depicted here is manufactured by Hewlett-Packard, Inc., but could be any suitable replacement having similar characteristics.

Figure 2:
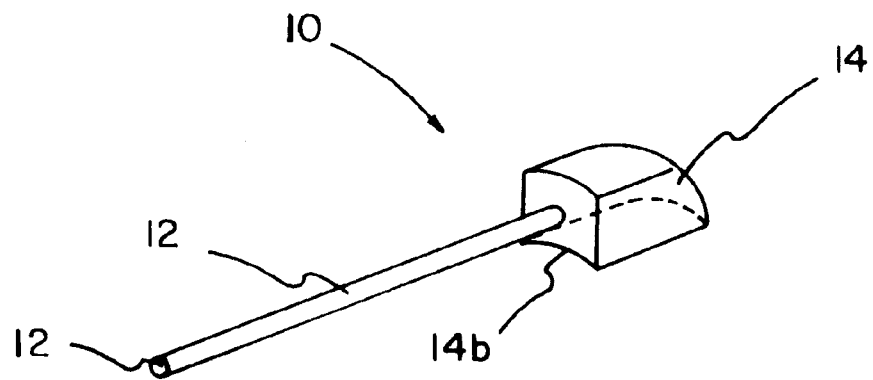
FIG. 2 is a perspective view of the scanner guide of the present invention.

As more clearly shown in FIG. 2, scanner guide 10 is comprised of two major components: a guide pin 12 and mounting base 14. Pin 12 is an elongated cylinder in configuration including a convex tip portion 12a at the terminal end thereof.

Mounting base 14 is generally rectangular in configuration, but may include rounded corners to provide a comfortable finger grip for the user of the device.

Figure 3:
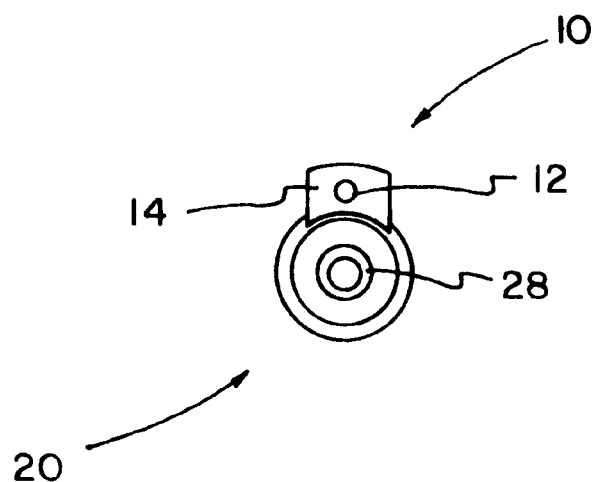
FIG. 3 is a front elevational view of the scanner wand showing the scanner guide installed thereon.

Mounting base 14 includes a radiused bottom surface 14b that is adapted to conform to the outside diameter of the pen-shaped scanner wand 20 as shown in FIG. 3.

Of course, the bottom surface 14b of mounting base 14 may be provided in various alternative embodiments (not shown) such as flat, V-shaped or other suitable configurations for adaptation to other commercially available scanner wands.

In the preferred embodiment, the bottom surface 14b of the mounting base 14 will be provided with a self-adhesive material (not illustrated) of the type having a removable backing for securing the scanner guide 10 to the scanner wand 20.

Since such self-adhesive materials with a removable backing are well known to those skilled in the art, further detailed discussion of the same is not deemed necessary.

Scanner guide 10 can be fabricated entirely from molded plastic or alternatively from other suitable materials.

Figure 4:
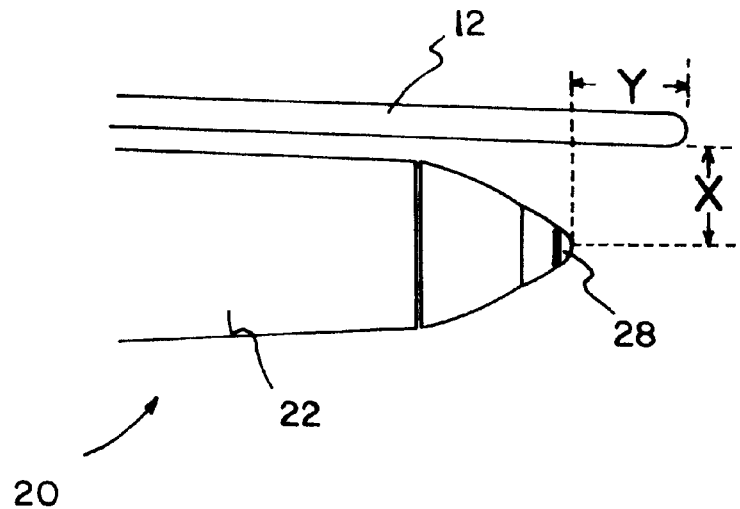
FIG. 4 is an enlarged top plan view of a proximal end of the scanner wand showing the dimensional relationship between the scanner wand and the scanner guide.

Critical to the use of the present invention is the functional position of the scanner guide 10 in relation to the scanner wand 20 as shown in FIG. 4.

It is necessary that guide pin 12 be disposed in parallel relation to a center axis of wand 20 at a predetermined distance therefrom corresponding to dimension "X".

After much experimentation it has been determined that the dimension "X" as measured from a center line of the lens 28 of scanner wand 20 to the surface of guide pin 12 should be in range of 0.3 inches to obtain an accurate reading from a bar coded label 35 applied to cylindrical items such as Vacutainer tubes ranging in size from 0.375 inches to 0.625 inches.

Similarly, the tip portion 12a of guide pin 12 must extend to a predetermined distance "Y" beyond the lens 28 of scanner wand 20 in order to properly contact an outside diameter of the Vacutainer tube or other cylindrical item having a bar coded label applied thereto.

After much experimentation, it has been determined that the dimension from the lens 28 to the tip portion 12a of guide pin 12 corresponding to dimension "Y" must be in the range of 0.35 inches to obtain a reading with the above described Vacutainer tubes or other similar sized items.

It will be understood that dimensions "X" and "Y" may vary within reasonable limits of tolerance. Further, it will appreciated by those skilled in the art that the scanner guide 10 may be manufactured to accommodate either larger or smaller cylindrical items within practical limits of size.

In practice, a bar code complying with industry standards requires that its height be at least 15 percent of its length or 0.25 inches, whichever is greater. Thus, the scanner guide 10 of the present invention may be increased or decreased in size to accommodate a variety of cylindrical items to which bar coded labels 35 may be applied for identification purposes.

In practical use of the present invention, the scanner guide 10 is installed in its proper functional position on a compatible scanner wand 20 in accordance with the dimensional relationships described hereinabove. This may be accomplished, initially, during the manufacturing process of the scanner wand wherein the scanner guide 10 is provided as an accessory item or, in the alternative, the scanner guide 10 may be installed on a pre-existing scanner wand 20 as an after-market device.

Figure 5:
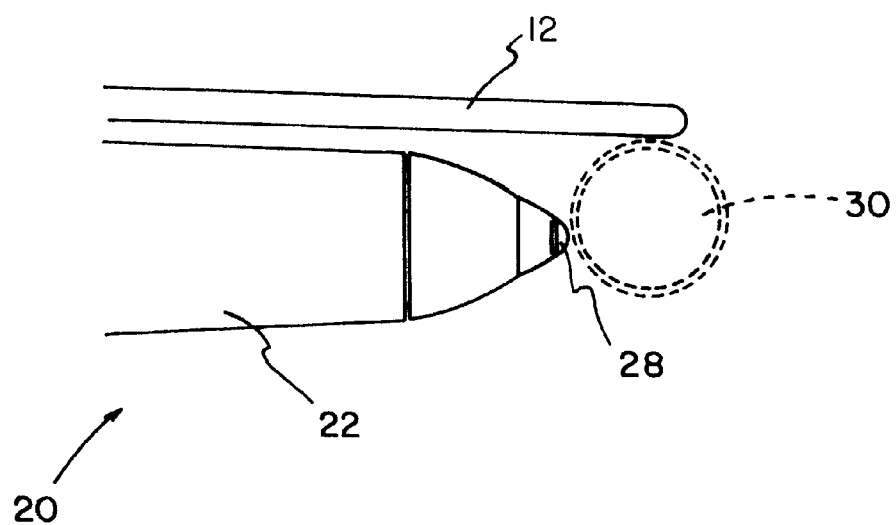
FIG. 5 is an enlarged top plan view of the scanner wand and scanner guide disposed on a cylindrical container.

Next, the scanner wand 20 with the guide 10 attached thereto is positioned in operative relationship with the Vacutainer tube 30 or other cylindrical item as shown in FIG. 5.

It should be noted that the bar coded label 35 must be applied to the surface of the tube 30 or other item so as to extend longitudinally in generally parallel relation to a center axis of tube 30 in order to obtain a proper reading using the device of the present invention. The bar coded label 35 mast be placed in direct alignment with lens 28 of the scanner wand 20 as shown in FIG. 6.

Figure 6:
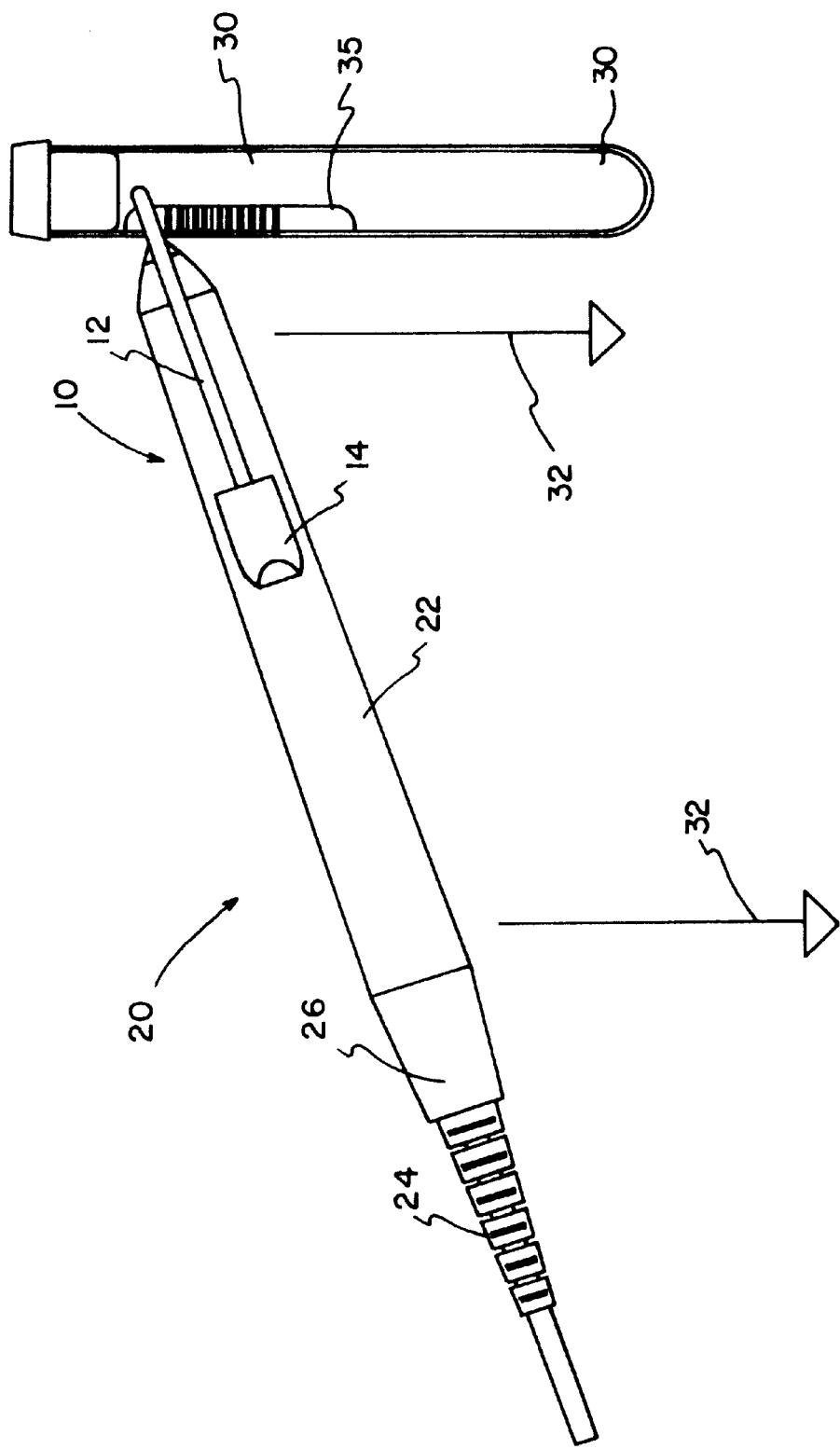
FIG. 6 is a side elevational view of the scanner wand and scanner guide in its operative position in relation to a cylindrical container.

Next, scanner wand 20 is tilted to approximately a 20 degree angle relative to a plane perpendicular to the center axis of tube 30 as shown in FIG. 6.

While maintaining tube 30 in contact with the tip portion 12a of the scanner guide 10, the scanner wand 20 is passed over the bar coded label 35 to obtain an accurate reading. The guide pin 12 imparts linear stability to the scanner wand 20 holding it at a proper disposition to the bar code label 35 as it is passed thereover. This arrangement provides a proper reading with a single passing and eliminates the necessity of numerous attempts it reading the bar coded label 35.

From the above it can be seen that the scanner guide 10 of the present invention provides a simple, yet efficient means for adapting a commercially available optical scanner for use in reading a bar code label applied to a cylindrical item.

In addition, the present invention provides a method of converting a pre-existing, scanner wand suitable for use on a flat surface to a scanner wand that is compatible for reading bar code labels applied to cylindrical items, which provides obvious economic advantages.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A scanner guide means for use in combination with a pre-existing, optical scanner wand, said wand having a longitudinal axis and being adapted for reading bar coded labels, said scanner guide means comprising:

means for controlling a proper alignment of said wand in relation to a bar coded label longitudinally disposed on a cylindrical surface, said controlling mean including an elongated, cylindrical pin disposed in generally parallel relation to said axis of said wand at a predetermined distance therefrom and extending a predetermined distance beyond a terminal end of said wand enabling a cylindrical object having a bar coded label disposed thereon to be held in contact with said pin in proper disposition to said label while said wand is passed over said bar coded label to obtain a reading; and means of securing said controlling means to said wand in a predetermined functional relationship such that an accurate reading of said label is obtained with a single passing of said wand over said label disposed on said cylindrical surface.

2. The guide means of claim 1 wherein said securing means includes a mounting base being fixedly attached in functional relation to said pin, said base having a bottom surface shaped to conform to an exterior surface of said wand whereon it is to be mounted.

3. The guide means of claim 2 wherein said bottom surface of said base is defined by a generally concave radius that is adapted for mounting on a generally cylindrical scanner wand.

4. The guide means of claim 1 wherein said securing means includes self-adhesive means for attaching said controlling means to said wand.

5. A method of converting a pre-existing optical scanner wand adapted for reading bar coded labels on a flat surface to a scanner wand having a longitudinal axis capable of reading bar coded labels disposed on a cylindrical surface, said method comprising the steps of:

fabricating an elongated, cylindrical pin having a convex tip formed at a terminal end thereof and a mounting base being fixedly attached at a proximal end thereof for controlling a proper disposition of said wand in relation to said bar coded label disposed on cylindrical surface;

calculating a position lying on an exterior surface of said wand for attachment of said mounting base thereon based upon the dimensions of said pin and the dimensions of said cylindrical surface whereon said bar coded label is disposed; and attaching said mounting base with said pin attached thereto to said exterior surface in parallel relation to said axis of said wand at said position enabling a proper reading of said label to be obtained with a single passing of said wand over said cylindrical surface.

6. The method of claim 5 wherein the step of fabricating further includes the step of:

forming said bottom surface of said mounting base to closely conform to said exterior surface of said wand whereon said base is to be mounted.

7. The method of claim 5 wherein the step of fabricating is carried out by a plastic injection molding process.

8. The method of claim 5 wherein the step of attaching is carried out by adhesive means.

9. The method of claim 5 wherein the step of attaching is carried out by integrally molding said mounting base to said scanner wand.

* * * * *